United States Patent
Kim et al.

(10) Patent No.: US 8,010,064 B2
(45) Date of Patent: Aug. 30, 2011

(54) SYSTEMS AND METHODS FOR TRANSMITTER CALIBRATION

(75) Inventors: Dukhyun Kim, Marietta, GA (US);
Young Sik Hur, Alpharetta, GA (US);
Jeong Hoon Kim, Seoul (KR)

(73) Assignee: Samsung Electro—Mechanics Company, Ltd. (KR)

( * ) Notice: Subject to any disclaimer, the term of this patent is extended or adjusted under 35 U.S.C. 154(b) by 764 days.

(21) Appl. No.: 12/048,102

(22) Filed: Mar. 13, 2008

(65) Prior Publication Data

US 2009/0233562 A1 Sep. 17, 2009

(51) Int. Cl.
*H03C 1/62* (2006.01)

(52) U.S. Cl. .................. 455/115.2; 455/114.2; 455/126; 455/114.1; 375/296

(58) Field of Classification Search .................. 455/126, 455/125, 115.2, 115.1, 114.2, 114.1; 375/296–298
See application file for complete search history.

(56) References Cited

U.S. PATENT DOCUMENTS

| | | | | |
|---|---|---|---|---|
| 7,725,087 B2* | 5/2010 | Nielsen | ...... | 455/114.3 |
| 7,831,220 B2* | 11/2010 | Hammerschmidt et al. | ...... | 455/114.1 |
| 2004/0032913 A1* | 2/2004 | Dinur | ...... | 375/298 |

* cited by examiner

*Primary Examiner* — Edward Urban
*Assistant Examiner* — Rui Hu
(74) *Attorney, Agent, or Firm* — Sutherland Asbill & Brennan LLP

(57) ABSTRACT

Systems and methods may be provided for transmitter calibration. The systems and methods may include providing one or more radio frequency (RF) test signals at an output of a transmitter, wherein the one or more RF test signals are based upon IQ baseband test signals, and applying an envelope detector to the one or more test signals to obtain one or more characteristic signals from the one or more RF test signals, where the one or more characteristic signals includes one or more first harmonic components and one or more second harmonic components associated with the one or more RF test signals. The systems and methods may further include analyzing the one or more second harmonic components to determine one or more IQ mismatch compensation parameters, and analyzing the one or more first harmonic components to determine one or more carrier leakage or DC offset compensation parameters.

19 Claims, 6 Drawing Sheets

SYSTEMS AND METHODS FOR TRANSMITTER CALIBRATION

FIELD OF THE INVENTION

Embodiments of the invention relate generally to radio frequency (RF) transmitters, and more particularly, to the calibration of RF transmitters.

BACKGROUND OF THE INVENTION

Direct conversion transceiver architectures are a popular choice for RF integrated circuit (IC) implementation in modern wireless communication applications due to their compact size and low power consumption as compared to a traditional heterodyne transceiver. The main drawbacks of a direct conversion transceiver are impairments such as DC offsets and IQ mismatch. Modern wireless communication protocols including wireless LAN (e.g., IEEE 802.11 a/g/n) utilize orthogonal frequency division multiplexing (OFDM) with high-order (e.g., 64-QAM) constellation sizes to exchange high data-rate information over time dispersive wireless channels. The IQ mismatch (insufficient image rejection) and carrier leakage (or DC offset) at the transmitter side should be well-controlled so that the transmitted signal can be demodulated at the receiver with as little distortion as possible.

Continuing advancement in wireless communication technologies and applications drive an effort to miniaturize the IC size. For example, the multiple-input multiple-output (MIMO) communication protocol, which requires a large number of duplicate RF and analog circuits as well as complex baseband digital system in a system-on-chip (SoC) implementation, complicates the issues of miniaturization, mismatches, and carrier leakages.

SUMMARY OF THE INVENTION

Effective method to compensate for the IQ mismatch and DC offsets/carrier leakage in wireless time-division duplex (TDD) transceivers with shared baseband filters is presented. Overall calibration strategy for transmitter with test tone is described first. Then, detailed IQ mismatch and DC offsets/carrier leakage calibration method with an envelope detector (ED) is presented. The calibration method exploits inherent architecture of the reconfigurable transceiver with shared baseband filters by directly estimating mixer phase mismatch and compensate for the DC offsets/carrier leakage more effectively.

According to an example embodiment of the invention, there may be a calibration method. The method may include providing one or more radio frequency (RF) test signals at an output of a transmitter, where the one or more RF test signals are based upon IQ baseband test signals, and applying an envelope detector to the one or more test signals to obtain one or more characteristic signals from the one or more RF test signals, where the one or more characteristic signals includes one or more first harmonic components and one or more second harmonic components associated with the one or more RF test signals. The method may also include analyzing the one or more second harmonic components to determine one or more IQ mismatch compensation parameters, and analyzing the one or more first harmonic components to determine one or more carrier leakage or DC offset compensation parameters.

According to another example embodiment of the invention, there may be a calibration system. The system may include one or more radio frequency (RF) test signal provided at an output of a transmitter, where the one or more RF test signals are based upon IQ baseband test signals, and an envelope detector that extracts one or more characteristic signal from the one or more RF test signals, where the one or more characteristic signals includes one or more first harmonic components and one or more second harmonic components associated with the one or more RF test signals. The system may also include a digital signal processor that is operative to receive the one or more characteristic signals that includes the one or more first harmonic components and the one or more second harmonic components, analyze the one or more second harmonic components to determine one or more IQ mismatch compensation parameters, and analyze the one or more first harmonic components to determine one or more carrier leakage or DC offset compensation parameters.

BRIEF DESCRIPTION OF THE DRAWINGS

Figure 1:
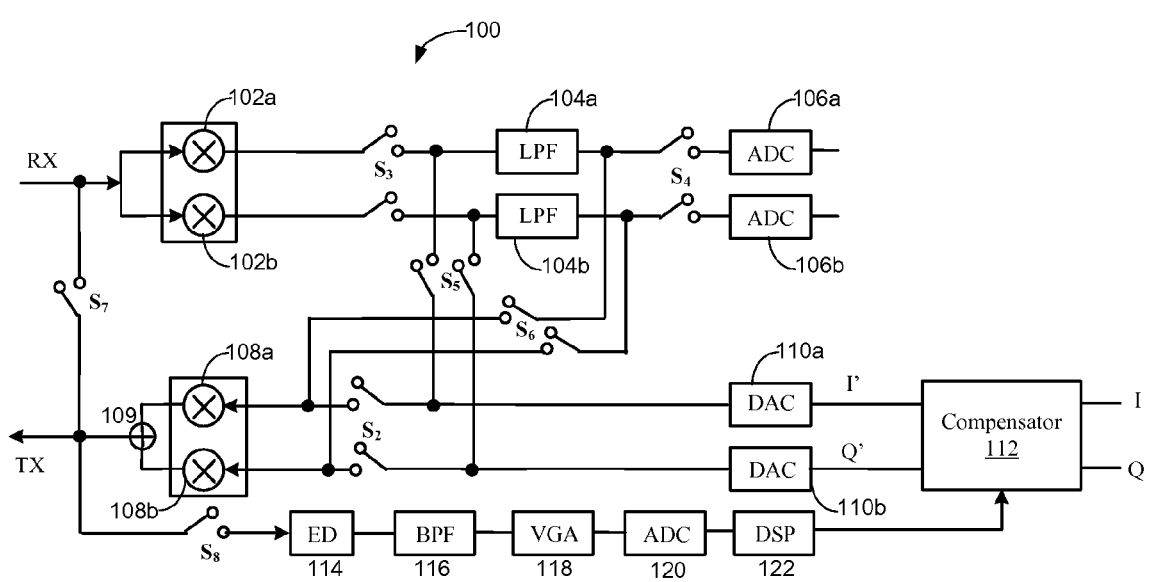

Having thus described the invention in general terms, reference will now be made to the accompanying drawings, which are not necessarily drawn to scale, and wherein:

FIG. 1 illustrates an example reconfigurable wireless time-division duplex (TDD) transceiver, according to an example embodiment of the invention.

Figure 2:
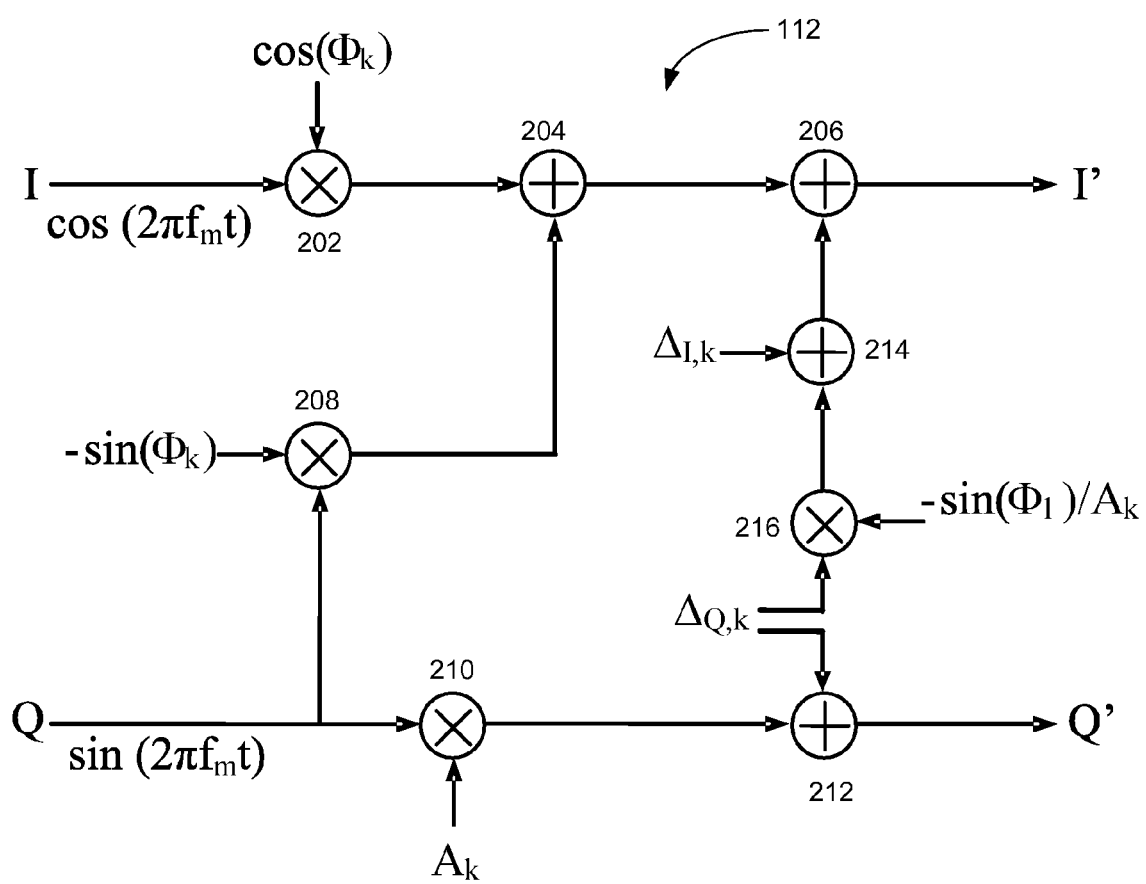

FIG. 2 illustrates an example digital compensator for IQ mismatches and DC offsets/carrier leakage, according to an example embodiment of the invention.

Figure 3:
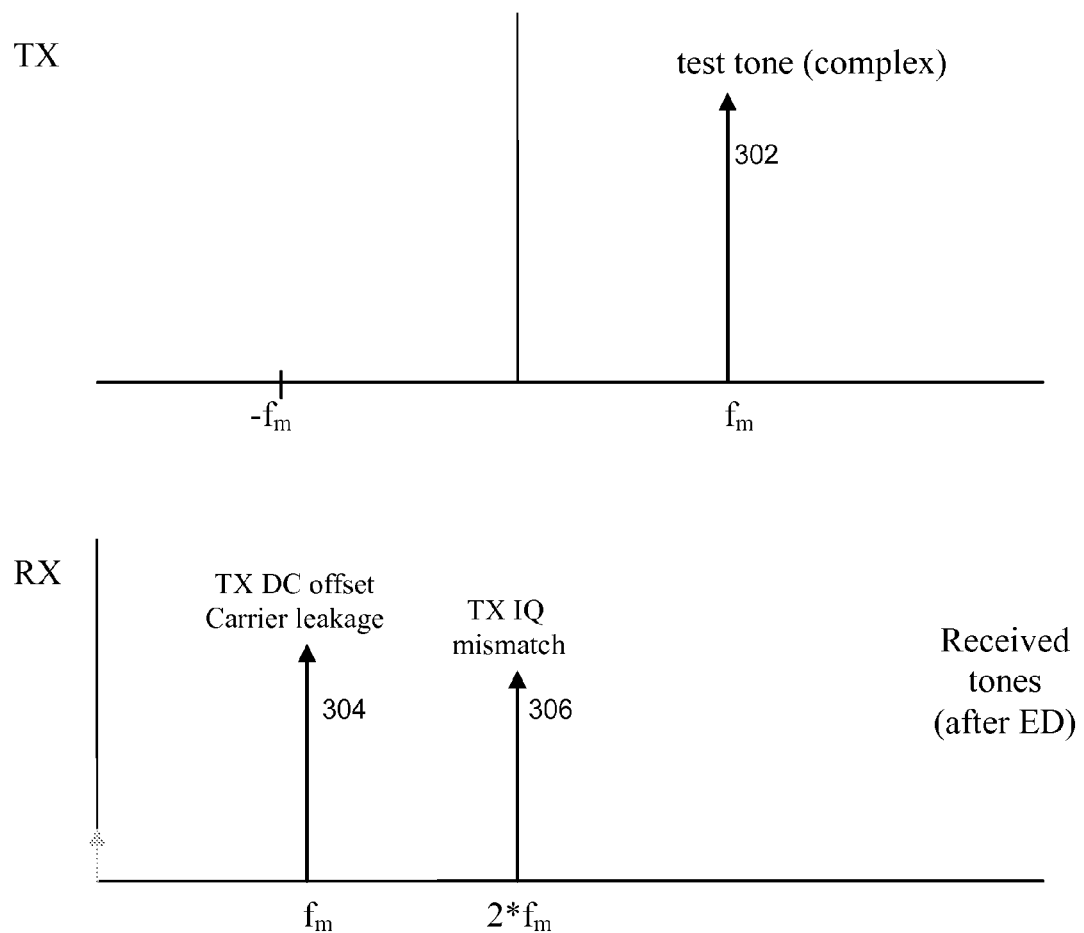

FIG. 3 illustrates an example test tone generation and a corresponding received tone analysis, according to an example embodiment of the invention.

Figure 4:
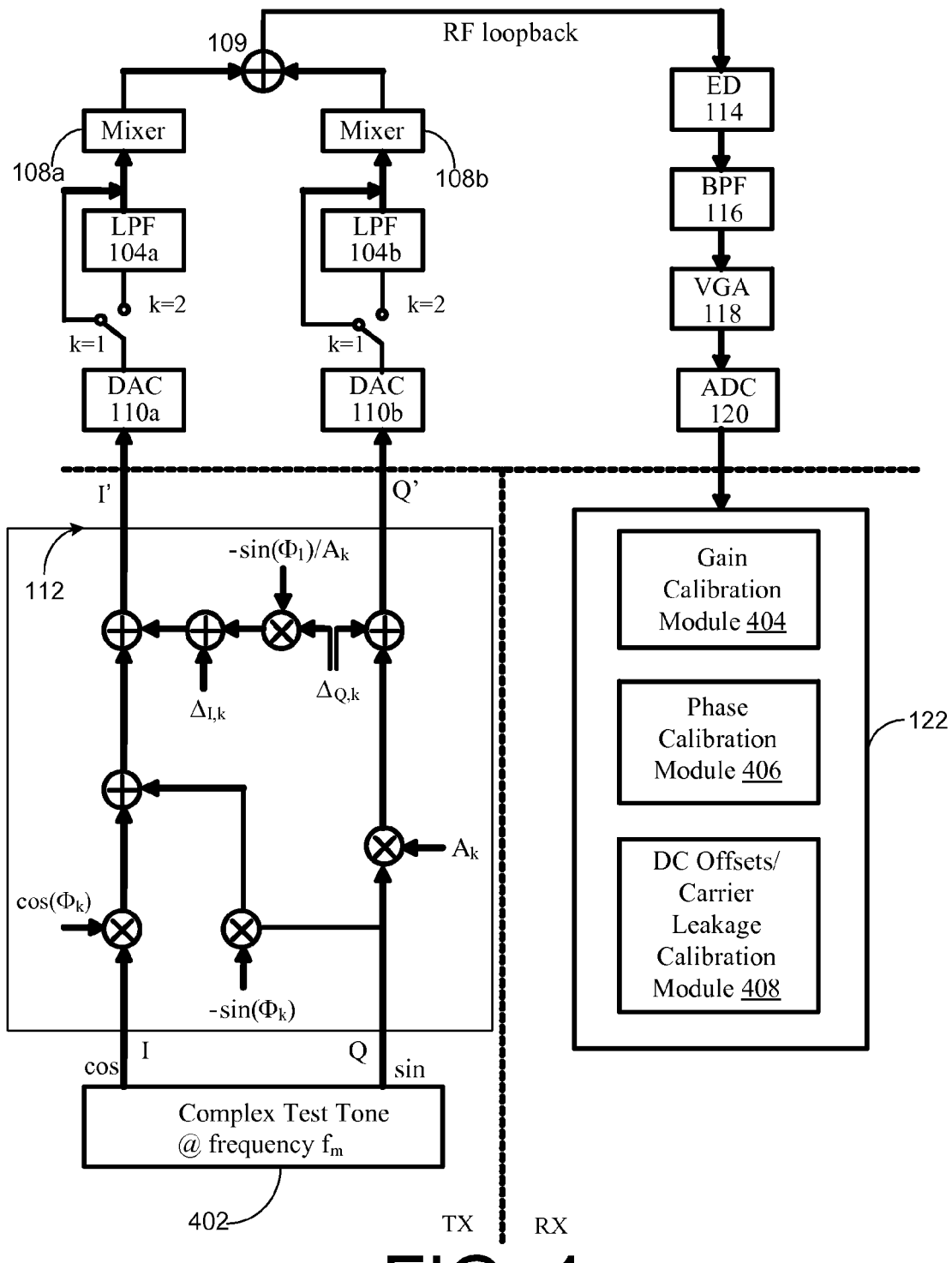

FIG. 4 illustrates an example block diagram for transmitter (TX) calibration, according to an example embodiment of the invention.

Figure 5:
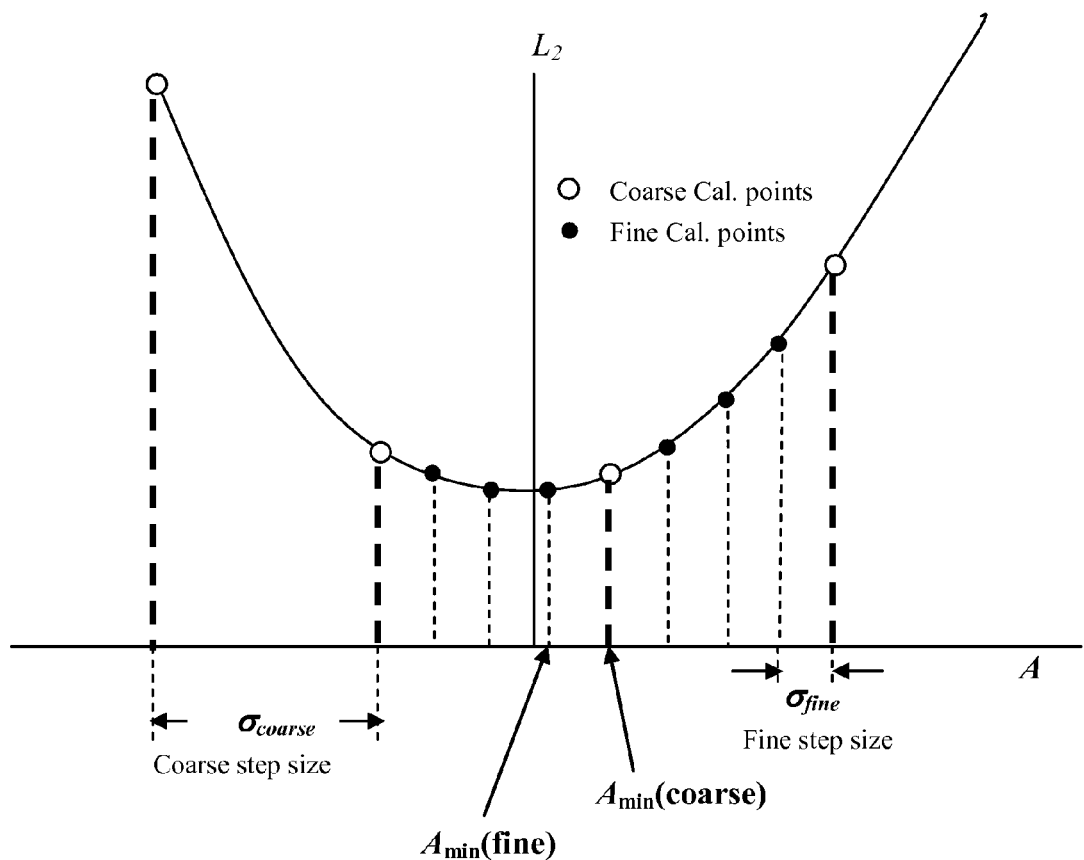

FIG. 5 illustrates a graphical example of coarse and fine calibration, according to an example embodiment of the invention.

Figure 6:
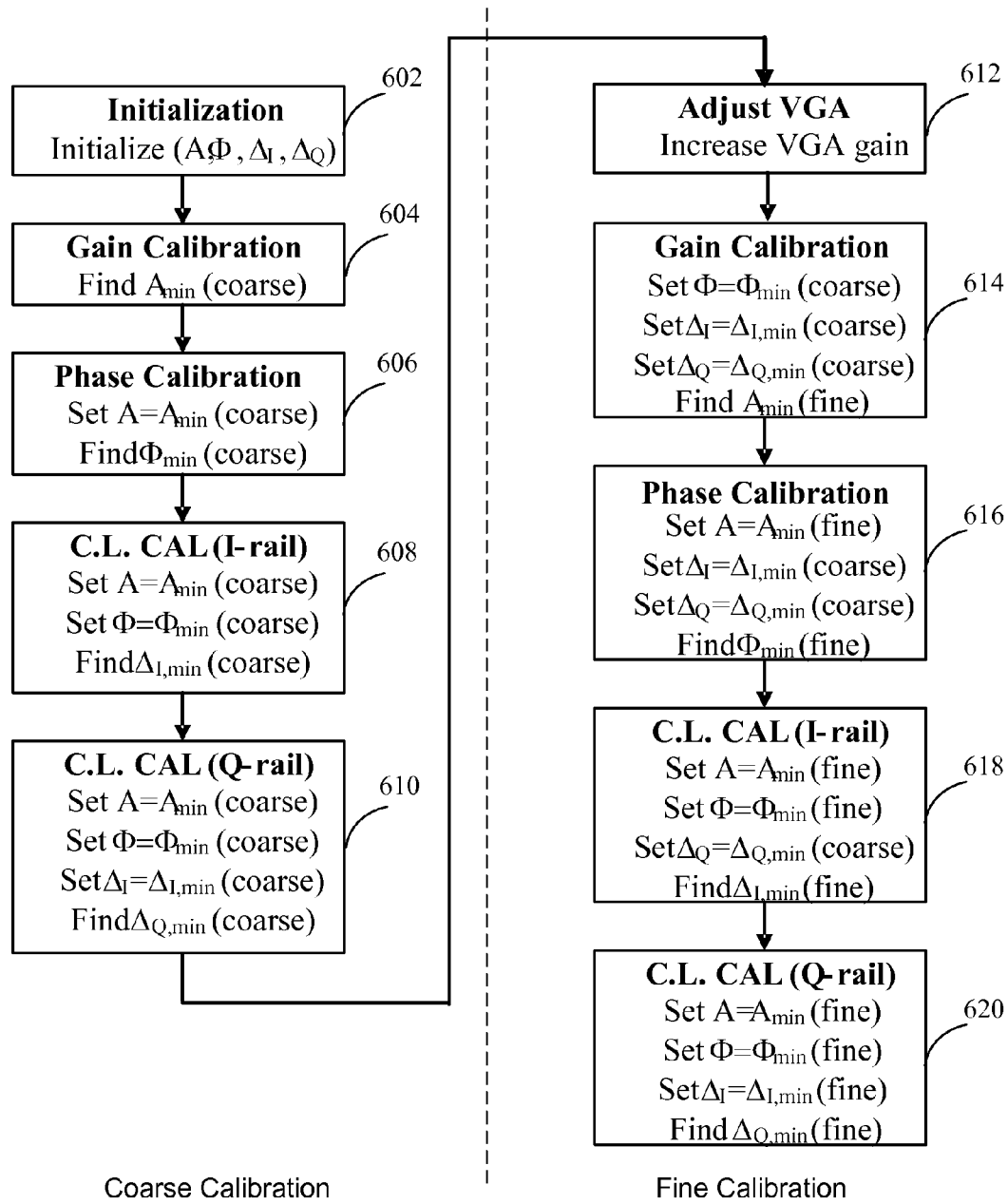

FIG. 6 illustrates an example block diagram for coarse and fine calibration, according to an example embodiment of the invention.

DETAILED DESCRIPTION OF THE INVENTION

Example embodiments of the invention now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Example embodiments of the invention may provide system and methods for calibration of transmitters, such as those utilized for wireless time-division duplex (TDD) transceivers. According to an example embodiment of the invention, the calibration systems and methods may compensate for IQ mismatches and/or DC offsets/carrier leakages associated with the transmitter.

FIG. 1 illustrates an example system for a transceiver 100 such as a reconfigurable wireless time-division duplex (TDD) transceiver, according to an example embodiment of the invention. In FIG. 1, the transceiver 100 may include at least one receive (RX) path and at least one transmit (TX) path. According to an example embodiment of the invention, at least one RX path may include mixers 102*a*, 102*b*, low pass filters 104*a*, 104*b*, and analog-to-digital converters (ADCs)

106a, 106b. Likewise, the at least one TX path may include a combiner 109, mixers 108a, 108b, low pass filters 104a, 104b, and digital-to-analog converters (DACs) 110a, 110b. It will be appreciated that the RX path and the TX path may share filters such as low pass filters 104a, 104b in accordance with an example embodiment of the invention. The shared filters such as filters 104a, 104b may be selectively connectable in the RX path or TX path using one or more switches (e.g., switches S2-S6)

During operation of the transceiver 100 in RX mode, the switches S2-S8 may be configured such that switches S3 and S4 may be enabled (e.g., closed) while the other switches S2, S5, S6, S7, S8 may be disabled (e.g., open), according to an example embodiment of the invention. With this switch configuration, a radio frequency (RF) signal may be received by an antenna and provided to the mixers 102a, 102b. The mixers 102a, 102b may downconvert the RF signal in one or more stages to an analog baseband signal that may be filtered by low-pass filters 104a, 104b before being digitized by ADCs 106a, 106b. Likewise, during operation of the transceiver 100 in TX mode, the switches S2-S8 may be configured such that switches S5 and S6 may be enabled while the other switches S2, S3, S4, S7, and S8 may be disabled, according to an example embodiment of the invention. With this switch configuration, digital IQ signals (or compensated I'-Q' signals) may be provided in separate I- and Q-rails to DACs 110a, 110b. The analog outputs of the DACs 110a, 110b may then be provided to mixers 108a, 108b for upconversion to RF frequencies. The RF output of the mixers 108,a, 108b may then be combined by combiner 109 and transmitted using one or more transmission antennas.

As also illustrated in FIG. 1, the example transceiver 100 may also include a compensator 112 that receives IQ signals and outputs compensated I'-Q' signals according to an example embodiment of the invention. The compensator 112 may include a variety of compensation values or parameters, including compensation values or parameters associated with compensating for IQ mismatches and/or DC offsets/carrier leakage, according to an example embodiment of the invention. The compensation values or parameters for the compensator 112 may be adjusted according to the example calibration described herein. In an example embodiment of the invention, the calibration may be performed using a feedback loop. The feedback loop, which may be enabled or otherwise connected through switch S8, may connect the RF output of the TX path to the compensator 112. The feedback loop may include an envelope detector 114, a filter 116 such as a bandpass filter (BPF), an amplifier 118 such as a variable gain amplifier (VGA), an analog to digital converter (ADC) 120, and a digital signal processor (DSP) 122, according to an example embodiment of the invention. The envelope detector (ED) may receive the transmitted RF test tone signal, and extract a characteristic signal. According to an example embodiment of the invention, the characteristic signal may include information needed to compensate for the IQ mismatches and/or the DC offsets/carrier leakage. The bandpass filter may be operative to filter signals outside the band of interest such as $[f_m, 2*f_m]$, where the test tone may be generated by a complex exponential function with frequency $f_m$. It will be appreciated that while the envelope detector 114 and bandpass filter 116 have been illustrated as separate devices, they could likewise be part of a single device—perhaps a single envelope detector—without departing from example embodiments of the invention. In some example embodiments, the envelope detector 114 may be a square-law device. However, the envelope detector 114 may also be a linear envelope detector or yet another type of envelope detector without departing from example embodiments of the invention.

Still referring to FIG. 1, the feedback loop may also include an amplifier 118 such as VGA. As described herein, the amplifier 118 may be operative to amplify the characteristic signal from the envelope detector 114, perhaps during a fine-mode calibration described herein. The ADC 120 may be operative to digitize the characteristic signal for input to the DSP 122. While ADC 120 has been illustrated separately from ADCs 106a or 106b, it will be appreciated that in other example embodiments of the invention, the ADC 120 could be the same as ADC 106a or ADC 106b. The DSP 122 may be operative to perform calibration calculations and generate digital compensation values for the compensator 112, according to an example embodiment of the invention.

In accordance with an example embodiment of the invention, a transmitter calibration may assist in compensating for IQ mismatches and/or DC offsets/carrier leakages in the example transceiver 100. Generally, the transmitter calibration may involve (i) generating a test tone (e.g., an IQ test tone), (ii) retrieving a characteristic signal from the test tone via an envelope detector, (iii) determining the optimal compensation values based upon an analysis of the characteristic signal, and (iv) applying the optimal digital compensation values in the compensator for generating a digitally compensated signal.

According to an example embodiment of the invention, the transmitter calibration may be performed twice—once in a first transceiver configuration ($TX_1$) without the low pass filters connected in the TX path, and once in a second transceiver configuration ($TX_2$) with the low pass filters connected in the TX path. The calibration with the first configuration ($TX_1$) may allow for isolating or determining the phase mismatch due to the mixer 108a, 108b. Once the phase mismatch of the mixer 108a, 108b has been determined, the appropriate phase mismatch compensation values in the compensator 112 may be set. With the phase mismatch compensation values set, the calibration with the second configuration ($TX_2$) may allow for determining, perhaps according to the coarse and/or fine-mode calibration methods described herein, the optimal compensation values that minimize the IQ mismatch (gain and phase) and DC offsets/carrier leakage. The optimal compensation values determined from the calibration in the second configuration ($TX_2$) may be utilized by the compensator 112 during normal TX mode, according to an example embodiment of the invention. Table I illustrates the appropriate switch S2-S8 positions for the first configuration ($TX_1$) and the second configuration ($TX_2$) for the transceiver 100 of FIG. 1.

TABLE I

CALIBRATION CONFIGURATION vs. SWITCH POSITIONS

|  | $S_2$ | $S_3$ | $S_4$ | $S_5$ | $S_6$ | $S_7$ | $S_8$ |
|---|---|---|---|---|---|---|---|
| $TX_1$ | 1 | 0 | 0 | 0 | 0 | 0 | 1 |
| $TX_2$ | 0 | 0 | 0 | 1 | 1 | 0 | 1 |

FIG. 2 illustrates a compensator 112 that receives IQ signals and outputs digitally compensated I'-Q' signals, according to an example embodiment of the invention. In FIG. 2, the compensator 112 may receive an I-component signal having a frequency $f_m$ such as $\cos(2\pi f_m t)$. Likewise, the compensator 112 may receive a Q-component signal having a frequency $f_m$ such as $\sin(2\pi f_m t)$. It will be appreciated that the I-component signal and the Q-component signal may be 90 degrees out of phase from each other. The compensator 112 may then process the received IQ signals using multipliers 202, 208, 210, 216, combiners 204, 206, 212, 214, and a variety of digital compensation values, according to an example embodiment of the invention. As shown in FIG. 2, the output of the compensator 112 may provide for digitally compensated I'-Q' signals as follows:

$$I' = \cos(2\pi f_m t)\cos(\Phi_k) - \sin(2\pi f_m t)\sin(\Phi_k) - \frac{\sin(\Phi_1)\Delta_{Q,k}}{A_k} + \Delta_{I,k},$$

and $$Q' = A_k \sin(2\pi f_m t) + \Delta_{Q,k}.$$

According to an example embodiment of the invention, $A_k$ may be the gain compensation value, $\Phi_k$ may be the phase compensation value, and $\Delta_{I,k}/\Delta_{Q,k}$ may be IQ carrier leakage compensation values (or DC offset compensation values), where configuration k=1 for a transmitter configuration without filters and configuration k=2 for a transmitter configuration with filters. It will be appreciated that while alternative embodiments of the compensator 112 are possible. For example, in an alternative embodiment, the "−sin" components in compensator 112 may be replaced with "+sin" components where the sweep range is symmetrical around the zero axis. Many other variations will be appreciated by those of ordinary skill in the art.

According to an example embodiment of the invention, a test tone may be generated in the baseband by a complex exponential function with frequency $f_m$, processed by compensator 112, and transmitted through the RF transmit path, either with or without the low pass filters 104a, 104b connected in the transmit path, as described herein. When the digital compensation parameters are applied by the compensator 112, the output v(t) of the envelope detector 114 may be expressed as follows:

$$v(t) = \beta x^2(t) \tag{1}$$

According to an example embodiment of the invention, the digitally compensated test tone x(t) may be as follows:

$$x(t) = \{\cos(2\pi f_m t)\cos(\Phi_k) - \sin(2\pi f_m t)\sin(\Phi_k)\}\cos(2\pi f_c t) + \tag{2}$$
$$A_k \alpha_k \sin(2\pi f_m t + \phi_k)\sin(2\pi f_c t + \phi_c) +$$
$$\left(\Delta_{I,k} - \frac{\sin(\Phi_1)}{A_k}\Delta_{Q,k} + \delta_{I,k}\right)\cos(2\pi f_c t) +$$
$$(\alpha_k \Delta_{Q,k} + \delta_{Q,k})\sin(2\pi f_c t + \phi_c).$$

Referring to (2), $f_c$ may be the RF carrier frequency, $\alpha_k$ may be the gain mismatch, $\phi_c$ may be the phase mismatch due to mixer 108a, 108b (in radians), $\phi_k$ may be the phase mismatch due to baseband filter 104a, 104b (in radians, $\phi_1=0$), and $\delta_{I,k}$, $\delta_{Q,k}$ may be the carrier leakages in I&Q rails for calibration configuration k, where configuration k=1 for a transmitter configuration without filters and configuration k=2 for a transmitter configuration with filters. Additionally, $A_k$, $\Phi_k$, $\Delta_{I,k}$, $\Delta_{Q,k}$ may be the digital compensation values for configuration k. More specifically, $A_k$ may be the gain mismatch compensation value, $\Phi_k$ may be the phase mismatch compensation value, and $\Delta_{I,k}$, $\Delta_{Q,k}$ may be the IQ carrier leakage compensation values (or DC offset compensation values), according to an example embodiment of the invention.

Subsequent to the envelope detector 114, the bandpass filter 116 may remove signal components outside $[f_m, 2f_m]$ band such as DC and RF signal components. Accordingly, the output $\tilde{v}_k(t)$ of the bandpass filter may be expressed as follows:

$$\tilde{v}_k(t) = \tilde{v}_{f,k}(t) + \tilde{v}_{2f,k}(t) \tag{3}$$

where $\tilde{v}_{f,k}(t)$ and $\tilde{v}_{2f,k}(t)$ may represent the remaining first and second harmonic components.

The second harmonic component $\tilde{v}2f,k(t)$ may be expressed as follows:

$$\tilde{v}_{2f,k}(t) = \tag{4}$$
$$A_k \alpha_k \cos(4\pi f_m t + \Phi_k + \phi_k - \phi_c) - A_k \alpha_k \cos(4\pi f_m t + \Phi_k + \phi_k + \phi_c) -$$
$$A_k^2 \alpha_k^2 \cos(4\pi f_m t + 2\phi_k) + \cos(4\pi f_m t + 2\Phi_k)$$

In (4), the second harmonic component $\tilde{v}_{2f,k}(t)$ may not include carrier leakage parameters $\delta_{I,k}$, $\delta_{Q,k}$; thus, the second harmonic component $\tilde{v}_{2f,k}(t)$ may be used to determine the IQ mismatch parameters independent of the carrier leakage. On the other hand, the first harmonic component $\tilde{v}_{f,k}(t)$ may exhibit some dependency on the IQ mismatch parameters as well as the carrier leakage itself as described below. Accordingly, the second harmonic component $\tilde{v}_{2f,k}(t)$ may be utilized to determine the DC offsets/carrier leakage parameters.

According to an example embodiment of the invention, the spectral component of (3) may be found by calculating its Fourier coefficients. After computations and first order approximation of sinusoidal functions with small arguments, spectral components in terms of squared magnitudes at frequency $f_m$ and $2f_m$ may be found and denoted as $Z_f$ and $Z_{2f}$, according to an example embodiment of the invention. FIG. 3 illustrates a first spectral component 304 at frequency $f_m$ and a second spectral component 306 at $2*f_m$, according to an example embodiment of the invention. As shown in FIG. 3, the first spectral component 304 may be analyzed to determine the DC offsets/carrier leakage while the second spectral component 306 may be analyzed to determine the IQ mismatch (e.g., gain and/or phase).

Since the IQ mismatch parameters may be found independent of carrier leakage parameters $\delta_{I,k}$, $\delta_{Q,k}$ at frequency $2f_m$, the second spectral component $Z_{2f}$ may be analyzed first. During $TX_1$ calibration ($\phi_1=0$, since the filter is not present when k=1) for determining the mixer phase mismatch, the spectral component $Z_{2f}$ may be determined as follows:

$$Z_{2f}(A_1, \Phi_1) = 1 + 4\Phi_1^2 - 8\phi_1 \Phi_1 \alpha_1 A_1 - 2(1 - 2\phi_1^2)\alpha_1^2 A_1^2 + \alpha_1^4 A_1^4. \tag{5}$$

By examining first and second derivatives of (5), for small IQ mismatch parameters, digital compensation values that minimize the spectral component $Z_{2f}$—and thus minimize the IQ mismatch—may be found as follows:

$$A_{1,min} = \frac{1}{\alpha_1} \tag{6}$$

$$\Phi_{1,min} = \phi_c.$$

It will be appreciated that the optimum gain mismatch compensation value $A_1$ may be a direct inverse of the gain mismatch parameter $\alpha_1$ and the optimum phase mismatch compensation value $\Phi_1$ may be the same as the mixer phase mismatch parameter $\phi_c$. However, these parameters ($\alpha_1$ & $\phi_c$) may not be known a priori. According to an example embodiment of the invention, optimum solutions for these parameters may be found using a DSP such as DSP 122 by minimizing the Fast Fourier Transform (FFT) output or other spectral component at frequency $2f_m$ while varying the gain and phase compensation values independently over a predetermined range of impairment thresholds. One of ordinary skill in the art will appreciate although the FFT may be one way of evaluating frequency response, other methods that provide frequency response estimate can also be utilized without departing from example embodiments of the invention.

For the $TX_1$ carrier leakage calibration, the spectral component at $f_m$ may be analyzed. With the optimum gain mismatch value $A_1$ and phase mismatch value $\phi_c$ determined from (6) being utilized (i.e. $A_1=1/\alpha_1$ and $\Phi_1=\phi_c$), the first harmonic component $Z_f$ may be represented as follows:

$$Z_f(\Delta_{I,1}, \Delta_{Q,1}) = (\delta_{I,1} + \phi_c \delta_{Q,1} + \Delta_{I,1})^2 + (\delta_{Q,1} + \alpha_1 \Delta_{Q,1})^2 \quad (7)$$

In an example embodiment of the invention, the first harmonic component $Z_f$ may be minimized—and thus minimize the carrier leakage—for the following values of $\Delta_{I,1}$ and $\Delta_{Q,1}$:

$$\Delta_{I,1,min} = -\delta_{I,1} - \phi_c \delta_{Q,1} \quad (8)$$

$$\Delta_{Q,1,min} = -\frac{\delta_{Q,1}}{\alpha_1}. \quad (9)$$

It will be appreciated that the that the second term in (8)—that is, $\phi_c \delta_{Q,1}$—may represent contribution of the carrier leakage crosstalk between I & Q rails (e.g., from Q rail to I rail) due to the mixer phase mismatch. Accordingly, residual carrier leakage may occur if a correction signal were added independently in the I & Q rails. However, according to an example embodiment of the invention, the mixer phase mismatch $\phi_c$ may be estimated first and then applied to the carrier leakage calibration. Therefore, the carrier leakage crosstalk may be compensated and no residual carrier leakage may remain, according to an example embodiment of the invention.

For the $TX_2$ calibration ($\phi_2 \neq 0$), it can be shown that the spectral component $Z_{2f}$ may be determined as follows:

$$Z_{2f}(A_2, \Phi_2) = 1 + 4\Phi_2^2 - 8\phi_2 \Phi_2 \alpha_2 A_2 - 2(1 - 2\phi_c^2 + 4\phi_f \Phi_2)\\ \alpha_2^2 A_2^2 + 8\phi_c \phi_f \alpha_2^3 A_2^3 + (1 + 4\phi_f^2)\alpha_2^4 A_2^4 \quad (10)$$

According to an example embodiment of the invention, the spectral component $Z_{2f}$ may be minimized for the following values of $A_2$ and $\Phi_2$:

$$A_{2,min} = \frac{1}{\alpha_2} \quad (11)$$

$$\Phi_{2,min} = \phi_f + \phi_c. \quad (12)$$

It will be appreciated that the optimum phase mismatch compensation value $\Phi_2$ in (12) may be a sum of the analog baseband filter mismatch value $\phi_f$ and mixer phase mismatch value $\phi_c$. However, the mixer phase mismatch value $\phi_c$ may have been previously determined during the $T_{X1}$ calibration. According to an example embodiment of the invention, the carrier leakage compensation values $\Delta_I$ and $\Delta_Q$ for the $TX_2$ calibration may be found as follows:

$$\Delta_{I,2,min} = -\frac{(1+\phi_f^2)\delta_{I,2} + \phi_c \delta_{Q,2}}{1+\phi_f^2} \approx -\delta_{I,2} - \phi_c \delta_{Q,2}. \quad (13)$$

$$\Delta_{Q,2,min} = -\frac{(1+\phi_f^2+\phi_c\phi_f)\delta_{Q,2}}{(1+\phi_f^2)\alpha_2} \approx -\frac{\delta_{Q,2}}{\alpha_2}. \quad (14)$$

Therefore, $$\Delta_{I,k,total} = \Delta_{I,k,min} - \frac{\sin(\Phi_{1,min})}{A_{k,min}} \Delta_{Q,k,min} \approx -\delta_{I,k}, k=1,2 \quad (15)$$

According to an example embodiment of the invention, for a DSP implementation, optimum solutions can be found by minimizing the FFT output at frequency $f_m$ while varying the I-rail and Q-rail compensation values independently over a predetermined range of impairment thresholds. When these compensation values applied, the impaired test signal found in (2) may now be corrected as follows:

$$\bar{x}(t) = \cos(\phi_c)\cos\{2\pi(f_c - f_m)t - \phi_k\}, k=1, 2 \quad (16)$$

which may be an amplitude-scaled and phase-shifted version of the uncorrupted test signal. Accordingly, carrier leakages and IQ mismatches (e.g., gain and/or phase) may be effectively compensated for, according to an example embodiment of the invention.

FIG. 4 illustrates an example block diagram for transmitter (TX) calibration for compensating for carrier leakages and IQ mismatches, according to an example embodiment of the invention. As shown in FIG. 4, a complex test tone 402 with frequency $f_m$ may be generated digitally at the transmitter (e.g., an IQ signal). The test tone 402 may then be compensated digitally at compensator 112 to correct for IQ mismatches and DC offset/carrier leakage. The digitally compensated test tone (e.g., I'-Q' signal) may then be sent to the DACs 110a, low-pass filters 104a, 104b, mixers 108a, 108b, and combiner 109, and received by the envelope detector (ED) 114 in the RF feedback loop. Characteristics signals may be processed by a bandpass filter 116 and optionally a VGA 118. An ADC 120 may digitize the characteristic signals and provide the digitized data (e.g., digital signal samples) to the DSP 122 for analysis. The DSP 122 may include a plurality of modules, including a gain calibration module 404, a phase calibration module 406, and a DC offset/current leakage calibration module 408, according to an example embodiment of the invention. The DSP 122 may determine optimal digital compensation values for the compensator 112 that best correct IQ mismatches (gain & phase) and DC offsets/Carrier Leakage (in I & Q rails), respectively.

Generally, it will be appreciated that the DC offset/Carrier Leakage at the transmitter may affect the received tone at frequency $f_m$, and the IQ mismatch at the transmitter may affect the received tone at frequency $2*f_m$. For each impairment parameter, a range may be given to search within. Within the range, an optimum compensation value may be iteratively found after evaluating power of the appropriate tone (e.g., $f_m$ for DC offsets/Carrier Leakage, and $2*f_m$ for gain/phase mismatches) for all possible compensation values.

According to an example embodiment of the invention, the DSP 122 may be operative to determine the average power $L_1$ at frequency $f_m$ as follows:

$$L_1 = \left\{\sum_{k=0}^{N-1} r_k \cos(2\pi f_m k)\right\}^2 + \left\{\sum_{k=0}^{N-1} r_k \sin(2\pi f_m k)\right\}^2.$$

Likewise, the DSP 122 may be operative to determine the average power $L_2$ at frequency 2*fm as follows:

$$L_2 = \left\{\sum_{k=0}^{N-1} r_k \cos(2\pi(2f_m)k)\right\}^2 + \left\{\sum_{k=0}^{N-1} r_k \sin(2\pi(2f_m)k)\right\}^2$$

The gain calibration module 404 of DSP 122 may be operative to determine the optimum gain compensation value A. In an example embodiment of the invention, the gain calibration module 404 may analyze the average power $L_2$ at frequency 2*fm to determine the optimum gain compensation value A. As an example, the gain calibration module 404 may iterate through a gain mismatch range to determine the optimum gain mismatch compensation value A that minimizes the magnitude of the average power $L_2$ at frequency 2*fm, according to an example embodiment of the invention.

The phase calibration module 406 of DSP 122 may be operative to determine the optimum phase compensation value Φ. In an example embodiment of the invention, the phase mismatch module 406 may analyze the average power $L_2$ at frequency 2*fm to determine the optimum phase compensation value Φ. As an example, the phase compensation module 406 may iterate through a phase mismatch range to determine the optimum phase mismatch compensation value Φ that minimizes the magnitude average power $L_2$ at frequency 2*fm, according to an example embodiment of the invention.

The DC Offsets/Carrier Leakage Calibration Module 408 may be operative to perform calibration (e.g., DC calibration) for the I and Q rails independently, according to an example embodiment of the invention. For example, DC calibration for the I-rail may be performed initially followed by DC calibration for the Q-rail. The average power $L_1$ of the received tone at frequency $f_m$, may be calculated for a range of DC compensation values ($\Delta_I$) to find the optimum DC Offset/Carrier Leakage compensation value $\Delta_I$ that minimizes the magnitude of average power $L_1$. The calibration process may continues iteratively until entire DC offset range may be examined while the compensation value may be incremented in each iteration. After the optimum $\Delta_I$ value is found, the DC calibration process may proceed to the Q rail to find the optimum DC Offset/Carrier Leakage compensation value $\Delta_Q$ value.

It will be appreciated that the modules 404, 406, and 408 of DSP 122 may operate in a coarse calibration mode and/or a fine calibration mode, according to an example embodiment of the invention. The step sizes in a coarse calibration mode may be larger than for a fine calibration mode, as illustrated in FIG. 5. The coarse calibration mode may be utilized to reduce search time and/or utilize the VGA 118 gain more efficiently. After the coarse calibration, optimum values (coarse) for compensation values A, Φ, $\Delta_I$, and $\Delta_Q$ become available for use during the fine calibration mode.

The course calibration and fine calibration mode will now be illustrated in further detail with respect to the flow diagram of FIG. 6. In FIG. 6, blocks 604-610 may be associated with the coarse calibration mode while blocks 614-620 may be associated with the fine calibration mode.

The coarse calibration in FIG. 6 may be initialized in block 602. The initialization in block 602 may involve initializing the digital compensation values, including may be the gain mismatch compensation value A, the phase mismatch compensation value Φ, and the IQ carrier leakage compensation values $\Delta_I$, $\Delta_Q$ (or DC offset compensation values) for the I- and Q-rails. In block 604, the gain calibration module 404 may determine the optimum gain compensation value $A_{min}$ that minimizes the magnitude of the average power $L_2$ at frequency 2*$f_m$. In block 606, processing continues to the phase calibration module 406 for I-rail calibration. The phase calibration module 406 may utilize the optimum gain compensation value $A_{min}$ determined in block 606 in the compensator 112. The phase calibration module 406 may then determine the optimum phase compensation value $\Phi_{min}$ that minimizes the magnitude of the average power $L_2$ at frequency 2*$f_m$.

In block 608, processing continues to the DC offsets/carrier leakage calibration module 408. The calibration module 408 may utilize the optimum gain compensation value $A_{min}$ determined in block 606 as well as the optimum phase compensation value $\Phi_{min}$ determined in block 606 in the compensator 112. The calibration module 408 may then determine the optimum I-rail DC offsets/carrier leakage compensation value $\Delta_{I,min}$ that minimizes the magnitude of the average power $L_1$ at frequency $f_m$. In block 610, the calibration module 408 may utilize the optimum gain compensation value $A_{min}$ determined in block 606, the optimum phase compensation value $\Phi_{min}$ determined in block 608, and the optimum I-rail DC offsets/carrier leakage compensation value $\Delta_{I,min}$ in the compensator 112. The calibration module 408 may then determine the Q-rail DC offsets/carrier leakage compensation value $\Delta_{Q,min}$ that minimizes the magnitude of the average power $L_1$ at frequency $f_m$.

Following the coarse calibration mode in blocks 604-610, the DSP 122 may optionally proceed to a fine calibration mode. During the fine calibration mode, the gain of the VGA 118 may be increased in block 612 to provide enhanced resolution for analyzing the characteristic signal in the fine calibration mode. Processing may then proceed with block 614 to determine the fine-mode gain compensation value $A_{min}$ (fine). In block 614, the digital compensation values, including the optimum phase compensation values $\Phi_{min}$ and DC offsets/carrier leakage compensation values $\Delta_{I,min}$ and $\Delta_{Q,min}$ determined from the coarse-calibration phase may be utilized for the compensator 112. With these compensation values set in the compensator 112, the gain calibration module 404 may iterate through smaller steps within the gain mismatch range to determine the optimum fine-mode gain compensation value $A_{min}$ (fine) that minimizes the magnitude of the average power $L_2$ at frequency 2*$f_m$.

In block 616, the optimum fine-mode phase compensation value $\Phi_{min}$ may be determined by the phase calibration module 406. In particular, in block 616, the fine-mode gain compensation value $A_{min}$ (fine) determined in block 614 may be utilized in the compensator 112. In addition, the DC offsets/carrier leakage compensation value $\Delta_{I,min}$ and $\Delta_{Q,min}$ determined from the coarse-calibration phase may be utilized for the compensator 112. With these compensation values set in the compensator 112, the phase calibration module 406 may iterate through the phase mismatch range to determine the optimum fine-mode phase compensation value $\Phi_{min}$ (fine) that minimizes the magnitude of the average power $L_2$ at frequency 2*$f_m$.

In block 618, the optimum fine-mode phase compensation value $\Delta_{I,min}$ for the I-rail may be determined by the DC offsets/carrier leakage calibration module 408. In particular, in block 618, the fine-mode gain compensation value $A_{min}$ (fine) determined in block 614 as well as the fine-mode phase compensation value $\Phi_{min}$ (fine) determined in block 616 may be utilized in the compensator 112. Additionally, the DC offsets/carrier leakage compensation value $\Delta_{Q,min}$ for the Q-rail determined from the coarse-calibration phase may be utilized for the compensator 112. With these compensation values set in the compensator 112, the DC offsets/carrier leakage calibration module 408 may iterate through the DC offset range to determine the optimum fine mode DC offsets/carrier leakage compensation value $\Delta_{I,min}$ (fine) for the I-rail.

In block 620, the optimum fine-mode phase compensation value $\Delta_{Q,min}$ for the Q-rail may be determined by the DC offsets/carrier leakage calibration module 408. In particular, in block 620, the fine-mode gain compensation value $A_{min}$ (fine) determined in block 614 as well as the fine-mode phase compensation value $\Phi_{min}$ (fine) determined in block 616 may be utilized in the compensator. Additionally, the optimum fine mode DC offsets/carrier leakage compensation value $\Delta_{I,min}$ (fine) may be utilized in the compensator 112. With these compensation values set in the compensator 112, the DC offsets/carrier leakage calibration module 408 may iterate through the DC offset range to determine the optimum fine mode DC offsets/carrier leakage compensation value $\Delta Q_{,min}$ (fine) for the Q-rail. Once the fine-mode compensation parameters have been determined according to blocks 614-620, they may be utilized in the compensator 112 for TX mode operation of the transceiver Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A calibration method, comprising:
    obtaining one or more radio frequency (RF) test signals at an output of a transmitter, wherein the one or more RF test signals are based upon IQ baseband test signals;
    applying an envelope detector to the one or more test signals to obtain one or more characteristic signals from the one or more RF test signals, wherein the one or more characteristic signals include one or more first harmonic components and one or more second harmonic components associated with the one or more RF test signals;
    analyzing, by a digital signal processor, the one or more second harmonic components to determine IQ mismatch compensation parameters, wherein the IQ mismatch compensation parameters include at least a gain mismatch compensation parameter and a phase mismatch compensation parameter;
    analyzing, by the digital signal processor, the one or more first harmonic components to determine carrier leakage or DC offset compensation parameters, including at least a first carrier leakage or DC offset compensation parameter and a second carrier leakage or DC offset compensation parameter; and
    applying, by a compensator, at least a compensation factor to an I- or Q-signal to generate a respective I- or Q-compensated signal, wherein the compensation factor is determined based upon:
        multiplying the first carrier leakage or DC offset compensation parameter with a value derived from both the gain mismatch compensation value and the phase mismatch compensation value to generate a multiplied value, and
        adding the multiplied value with the second carrier leakage or DC offset compensation parameter to generate the compensation factor.

2. The method of claim 1, wherein the gain compensation parameter is a coarse gain compensation parameter, wherein the phase compensation parameter is a coarse phase calibration parameter, wherein the first carrier leakage or DC offset compensation parameter is a coarse Q-rail compensation parameter, wherein the second carrier leakage or DC offset compensation parameter is a coarse I-rail carrier leakage compensation parameter, and during a coarse calibration, analyzing the first harmonic component and analyzing the second harmonic component includes:
    determining the coarse gain compensation parameter utilizing the one or more second harmonic components;
    determining the coarse phase compensation parameter utilizing the determined coarse gain compensation parameter and the one or more second harmonic components;
    determining the coarse I-rail carrier leakage compensation parameter utilizing the determined coarse gain compensation parameter, the determined coarse phase compensation parameter, and the one or more first harmonic components; and
    determining the coarse Q-rail carrier leakage compensation parameter utilizing the determined coarse gain compensation parameter, the determined coarse phase compensation parameter, the determined coarse I-rail carrier leakage compensation parameter, and the first harmonic component.

3. The method of claim 2, wherein the IQ mismatch compensation parameters further include a fine gain compensation parameter and a fine phase calibration parameter, wherein the carrier leakage or DC offset compensation parameters further include a fine I-rail carrier leakage compensation parameter and a fine Q-rail compensation parameter, and during a fine calibration, analyzing the first harmonic component and the analyzing the second harmonic component includes:
    determining the fine gain compensation parameter utilizing the determined coarse phase compensation parameter, the determined coarse I-rail compensation parameter, the determined coarse Q-rail compensation parameter, and the one or more second harmonic components;
    determining the fine phase compensation parameter utilizing the determined fine gain compensation parameter, the determined coarse I-rail compensation parameter, the determined coarse Q-rail compensation parameter, and the one or more second harmonic components;
    determining the fine I-rail carrier leakage compensation parameter utilizing the fine gain compensation parameter, the fine phase compensation parameter, the coarse Q-rail compensation parameter, and the one or more first harmonic components; and
    determining the fine Q-rail carrier leakage compensation parameter utilizing the determined fine gain compensation parameter, the determined fine phase compensation parameter, the determined fine I-rail compensation parameter, and the one or more first harmonic components.

4. The method of claim 1, wherein the transmitter includes a mixer, and wherein prior to providing the one or more RF test signals, the method includes:
   determining a mixer phase mismatch for a mixer of the transmitter, wherein the determined mixer phase mismatch is compensated for in the IQ baseband test signals.

5. The method of claim 4, wherein the determined mixer phase mismatch is utilized in determining the carrier leakage or DC offset compensation parameters.

6. The method of claim 4, wherein the one or more RF test signals are one or more second RF test signals, wherein the one or more characteristic signals are one or more second characteristic signals, and wherein determining the mixer phase mismatch includes:
   generating a first RF test signal at the output of the transmitter,
   applying the envelope detector to the first RF test signal to obtain a first characteristic signal; and
   analyzing the first characteristic signal to determine the mixer phase mismatch.

7. The method of claim 4, wherein the transmitter is selectively connectable with one or more filters shared with a receiver, wherein in determining a mixer phase mismatch, the one or more shared filters are not connected with the transmitter.

8. The method of claim 1, further comprising:
   providing the one or more determined IQ mismatch compensation parameters and carrier leakage or DC offset compensation parameters to the compensator.

9. The method of claim 1, wherein the gain mismatch compensation parameter is determined prior to the phase mismatch compensation parameter, and wherein the gain mismatch compensation parameter is utilized in determining the phase mismatch compensation parameter.

10. The method of claim 1, wherein the IQ mismatch compensation parameters are determined prior to the one or more carrier leakage or DC offset compensation parameters, wherein the determined IQ mismatch compensation parameters are utilized in determining the carrier leakage or DC offset compensation parameters.

11. The method of claim 1, wherein:
   analyzing the one or more second harmonic components includes iteratively calculating a first average power of the one or more second harmonic components across at least one first range and determining the one or more IQ mismatch compensation parameters that minimize the first average power; and
   analyzing the one or more first harmonic components includes iteratively calculating a second average power of the one or more first harmonic components across at least one second range and determining the one or more carrier leakage or DC offset compensation parameters that minimize the second average power.

12. The method of claim 1, further comprising:
   applying at least one of a filter or amplifier to the one or more characteristic signals prior to analyzing the one or more first harmonic components or the one or more second harmonic components.

13. A calibration system, comprising:
   an envelope detector that obtains one or more characteristic signals from one or more RF test signals, wherein the one or more RF test signals are obtained at an output of a transmitter, wherein the one or more RF test signals are based upon IQ baseband test signals, wherein the one or more characteristic signals include one or more first harmonic components and one or more second harmonic components associated with the one or more RF test signals;
   a digital signal processor that is operative to:
      analyze the one or more second harmonic components to determine IQ mismatch compensation parameters, wherein the IQ mismatch compensation parameters include at least a gain mismatch compensation parameter and a phase mismatch compensation parameter, and
      analyze the one or more first harmonic components to determine carrier leakage or DC offset compensation parameters, including at least a first carrier leakage or DC offset compensation parameter and a second carrier leakage or DC offset compensation parameter; and
   a compensator that applies at least a compensation factor to an I- or Q-signal to generate a respective I- or Q-compensated signal, wherein the compensation factor is based upon:
      multiplying the first carrier leakage or DC offset compensation parameter with a value derived from both the gain mismatch compensation value and the phase mismatch compensation value to generate a multiplied value, and
      adding the multiplied value with the second carrier leakage or DC offset compensation parameter to generate the compensation factor.

14. The system of claim 13, wherein the gain compensation parameter is a coarse gain compensation parameter, wherein the phase compensation parameter is a coarse phase calibration parameter, wherein the first carrier leakage or DC offset compensation parameter is a coarse Q-rail compensation parameter, wherein the second carrier leakage or DC offset compensation parameter is a coarse I-rail carrier leakage compensation parameter, and during a coarse calibration, the digital signal processor is operative to analyze the first harmonic component and the second harmonic component by:
   determining the coarse gain compensation parameter utilizing the one or more second harmonic components,
   determining the coarse phase compensation parameter utilizing the determined coarse gain compensation parameter and the one or more second harmonic components,
   determining the coarse I-rail carrier leakage compensation parameter utilizing the determined coarse gain compensation parameter, the determined coarse phase compensation parameter, and the one or more first harmonic components, and
   determining the coarse Q-rail carrier leakage compensation parameter utilizing the determined coarse gain compensation parameter, the determined coarse phase compensation parameter, the determined coarse I-rail carrier leakage compensation parameter, and the first harmonic component.

15. The system of claim 14, wherein the IQ mismatch compensation parameters further include a fine gain compensation parameter and a fine phase calibration parameter, wherein the one or more carrier leakage or DC offset compensation parameters further include a fine I-rail carrier leakage compensation parameter and a fine Q-rail compensation parameter, and during a fine calibration, the digital signal processor is operative to analyze the first harmonic component and the second harmonic component by:
   determining the fine gain compensation parameter utilizing the determined coarse phase compensation parameter, the determined coarse I-rail compensation parameter, the determined coarse Q-rail compensation parameter, and the one or more second harmonic components, determining the fine phase compensation parameter utilizing the determined fine gain compensation parameter, the determined coarse I-rail compensation parameter, the determined coarse Q-rail compensation parameter, and the one or more second harmonic components, determining the fine I-rail carrier leakage compensation parameter utilizing the fine gain compensation parameter, the fine phase compensation parameter, the coarse Q-rail compensation parameter, and the one or more first harmonic components, and determining the fine Q-rail carrier leakage compensation parameter utilizing the determined fine gain compensation parameter, the determined fine phase compensation parameter, the determined fine I-rail compensation parameter, and the one or more first harmonic components.

16. The system of claim 13, wherein the transmitter includes a mixer, and wherein prior to providing the one or more RF test signals, the digital signal processor is operative to determine a mixer phase mismatch for a mixer of the transmitter, wherein the determined mixer phase mismatch is compensated for in the IQ baseband test signals.

17. The system of claim 16, wherein the determined mixer phase mismatch is utilized in determining the carrier leakage or DC offset compensation parameters.

18. The system of claim 16, wherein the one or more RF test signals are one or more second RF test signals, wherein the one or more characteristic signals are one or more second characteristic signals, and further comprising a first RF test signal provided at the output of the transmitter, wherein the envelope detector obtains a first characteristic signal from the first RF test signal, wherein the digital signal processor is operative to determine the mixer phase mismatch by analyzing the first characteristic signal to determine the mixer phase mismatch.

19. The system of claim 13, wherein the digital signal processor is operative to analyze the one or more second harmonic components by iteratively calculating a first average power of the one or more second harmonic components across at least one first range and determining the one or more IQ mismatch compensation parameters that minimize the first average power, and wherein the digital signal processor is operative to analyze the one or more first harmonic components by iteratively calculating a second average power of the one or more first harmonic components across at least one second range and determining the one or more carrier leakage or DC offset compensation parameters that minimize the second average power.

* * * * *